July 13, 1943.  W. R. LUSTIG  2,324,264
AUTOMOBILE TRUNK LOCK
Filed Sept. 11, 1940   2 Sheets-Sheet 2
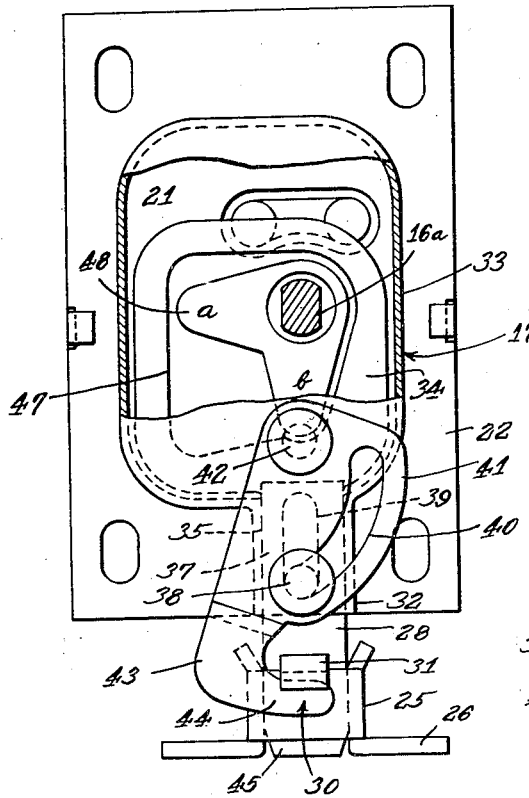
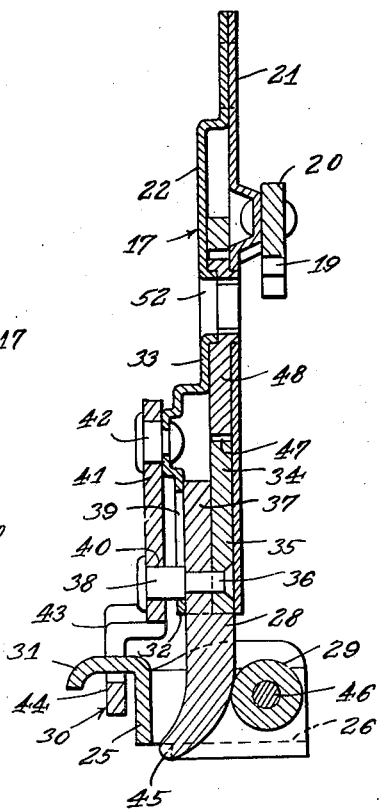
Inventor:
Walter R. Lustig
By
McCanna, Wintercorn & Morsbach
Attys.

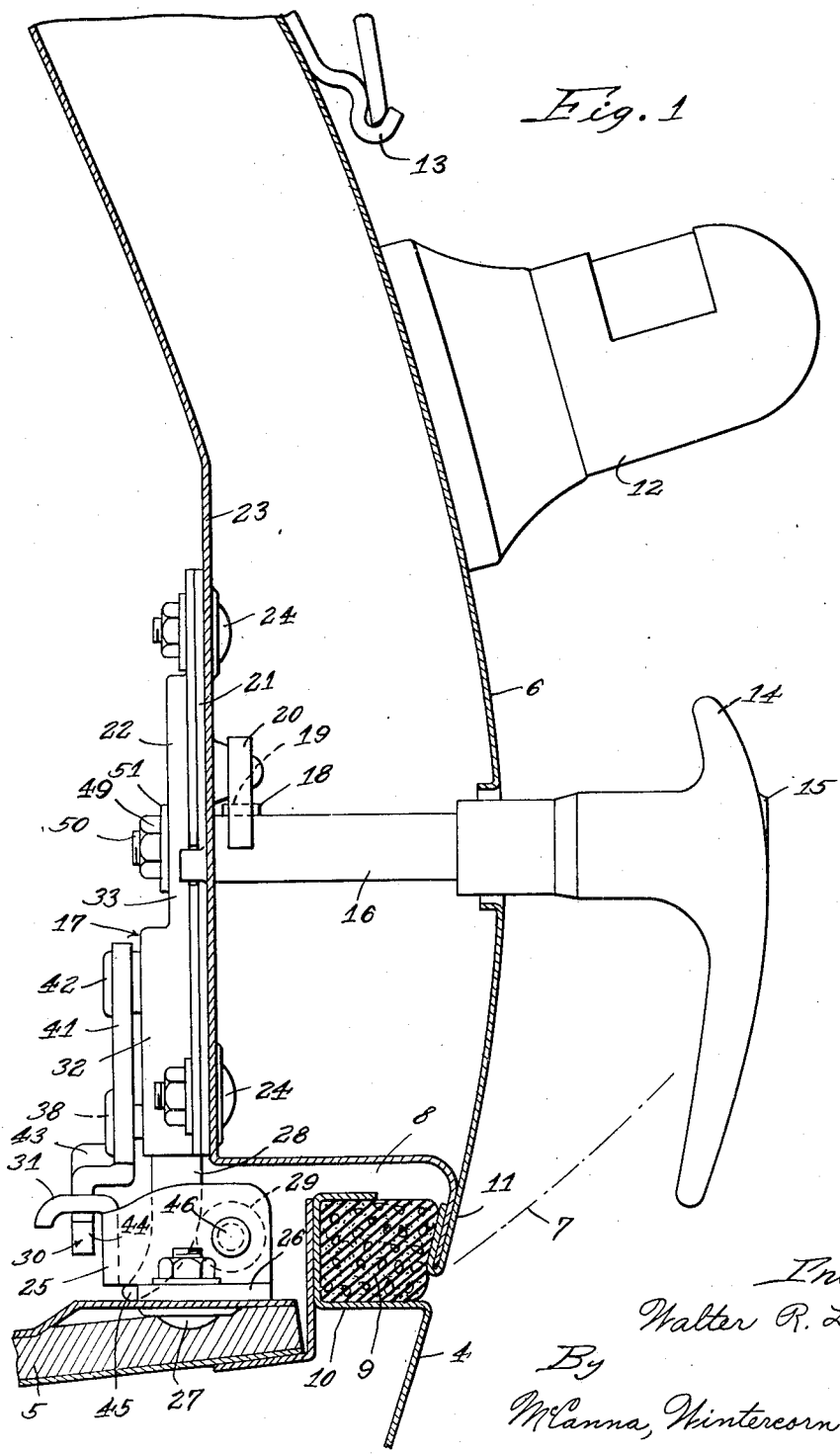

Patented July 13, 1943

2,324,264

UNITED STATES PATENT OFFICE 2,324,264

AUTOMOBILE TRUNK LOCK

Walter R. Lustig, Rockford, Ill., assignor to The Atwood Vacuum Machine Company, Rockford, Ill., a copartnership composed of Seth B. Atwood and James T. Atwood Application September 11, 1940, Serial No. 356,256

5 Claims. (Cl. 292—8)

This invention relates to a new and improved lock for automobile trunks.

Trunk locks on automobiles as heretofore constructed were not reliable because of the fact that the curved lid could be pried open enough to make the end of the bolt move clear of the keeper plate and thus permit opening the lid. It is, therefore, the principal object of my invention to provide a trunk lock including hook and eye means, which are interconnected coincidentally with the sliding home of the bolt into the keeper plate, whereby positively to prevent retracting the bolt by prying on the lid.

The lock of my invention has a hook pivotally mounted on the lock case and slidably interconnected with the reciprocating bolt so as to be moved forward into engagement with an eye on the keeper plate in a predetermined timed relation with the movement of the bolt toward the keeper plate. A special feature also is the provision of a roller on the keeper plate for rolling engagement with the bolt so as to make for easy locking and unlocking, another feature being the provision of a cam surface on the outer end of the bolt, which in the forward movement of the bolt rides on the roller and wedges the lid tightly closed.

The invention is illustrated in the accompanying drawings, in which—

Figure 1 is a vertical section through the lower portion of an automobile trunk and lid equipped with a lock made in accordance with my invention, the lock appearing in side elevation;

Fig. 2 is a longitudinal vertical section through the lock, and

Fig. 3 is an inside view of the lock with a portion of the case broken away to better illustrate the construction.

The same reference numerals are applied to corresponding parts in these three views.

In Fig. 1 the numeral 4 designates a rear portion of the automobile body and 5 the bottom or floor of the trunk compartment. 6 is the lid for the trunk, which is hinged at its upper edge on the body in the usual way to swing outwardly and upwardly from closed position so that the lower edge moves approximately along the arc indicated at 7. The lid forms a closure for the opening 8 through which access may be had into the trunk when the lid is raised. A conventional rubber sealing strip is indicated at 9 in the channel 10 which frames the opening 8 and is provided on the body 4, the strip being subject to compression by the outer marginal flange portion 11 of the lid in the usual way. The tail light appears at 12 below the license plate holder 13 and above the handle 14, by means of which the lid is arranged to be operated. A lock 15 is provided in the handle 14 in the usual way for detachably connecting the handle 14 to the stem 16 to operate the lock indicated generally by the numeral 17. When the trunk is "locked," the handle 14 is incapable of turning the stem 16 and operating the lock, the handle being under those conditions free to turn with respect to the stem 16, as is well known. However when the trunk is "unlocked," the handle 14 is connected with the stem 16 so that turning of the handle causes turning of the stem 16 and the operation of the lock 17. So long as the trunk is "locked" and the handle 14 is rotatable freely with respect to the stem 16, the latter is in turn locked against rotation by engagement of a latch 18 on the stem 16 in a notch 19 in a keeper plate 20 rigid with the back plate 21 of the lock case 22, whereby to prevent forcing the lock by attempted turning of the stem 16 independently of the handle 14. The latch 18 is a part of the same latch means for connecting the handle 14 with the stem 16 when the trunk is unlocked, said latch means serving interchangeably to lock the handle 14 to the stem 16 or the stem 16 to the keeper plate 20, as is well known. The back plate 21 and lock case 22 are rigidly secured to the inner wall 23 of the lid 6 as by bolts 24 for cooperation with a keeper plate 25, which has attaching arms 26 secured to the bottom or floor 5 of the trunk by bolts 27.

The lock 17 in accordance with my invention comprises, in addition to a reciprocable bolt 28 for cooperation with a roller abutment 29 in the keeper plate 25, a pivoted hook member 30 for cooperation with an eye 31 on the keeper plate 25, whereby through engagement of the hook in the eye coincidentally with the engagement of the bolt 28 with the abutment 29 and keeper plate 25 to "tie down" the lower end of the lid 6 so that the lid cannot be forced open by prying, as was possible heretofore. The bolt 28 is slidable in a guide 32 provided in the form of a channel-shaped portion of the lock case 22. The channel guide portion 32 opens into one end of a wider generally rectangular housing portion 33 on the lock case in which a generally rectangular sheet metal plate 34 is guided for reciprocatory movement, said plate having a narrow extension 35 which is riveted, as indicated at 36, to the shank portion 37 of the bolt 28. The rivet 36 has a portion 38 projecting through and movable along a slot 39 provided in a wall of the channel-shaped guide portion 32, the rivet portion 38 having slidable engagement in an arcuate slot 40 provided therefor in the shank portion 41 of the hook member 30. The slot 40 is in eccentric relation to the rivet 42 by means of which the shank portion 41 of the hook member 30 is pivoted on the outside of the lock case 33. The free end portion 43 of the hook member 30 is bent outwardly so as to provide the hook 44 in outwardly offset but parallel relation with the shank portion 41 of the hook member 30. This offset relationship provides for the desired spacing of the hook 44 relative to the outwardly curved end portion 45 of the latch bolt 28 so that the latter may operate inside the keeper plate 25 while the hook 44 operates outside the keeper plate, where it cooperates with the outwardly projecting eye projection 31 on the keeper plate, the keeper plate being U-shaped as shown with the eye projection 31 on the cross-portion of the U and with the abutment roller 29 mounted between the arms of the U on a rivet 46. It is clear that when the plate 34 is moved inwardly to retract the bolt 28 the rivet portion 38 sliding in the arcuate slot 40 causes the hook member 30 to turn in a clockwise direction, as viewed in Fig. 3, around its pivot 42 as a center so as to retract the hook end 44 from the eye 31 on the keeper plate 25. On the other hand, when the plate 34 is moved in the opposite direction to extend the bolt 28 into locking engagement with the abutment roller 29 on the keeper plate 25, the hook member 30 is swung in a counterclockwise direction in timed relation with the movement of the bolt 28 so as to move the hook end 44 into operative position under the eye projection 31 on the keeper plate. When the bolt 28 first engages the roller 29, the hook end 44 is still in retracted relation to the eye 31 and the bolt 28 therefore has an opportunity to first cam the lid tightly closed as the curved end 45 of the bolt rides on the roller in the extension of the bolt from the lock case 22. Then when the lid is moved almost all of the way in by this camming action of the bolt 28, the hook end 44 of the hook member 30 moves into operating position under the eye 31 in the final movement home of the bolt. Contrariwise in the retracting movement of the bolt 28 the hook end 44 of the hook member 30 is retracted from the eye 31 in the initial retracting movement of the bolt 28 and there is, therefore, no danger of the hook member scraping on the keeper plate and interfering with the easy operation of the lock. When the latch bolt 28 is fully retracted, the bolt and hook member 30 are both far enough removed from the keeper plate 25 to permit free opening and closing movement of the lid 6 along the arc 7.

The plate 34 for operating the latch bolt 28 and hook member 30 has an opening 47 therein in which a two-pointed star plate 48 operates to reciprocate the plate 34 by oscillatory movement of the plate 48 through 90°, the point $a$ of the star plate serving to retract the plate 34 in 90° clockwise movement, whereas the other point $b$ serves to move the plate 34 in the opposite direction in 90° counterclockwise movement of the plate 48. The star plate 48 is non-rotatably secured on the end portion 16a of the stem 16 by a nut 49 threaded on the reduced threaded extremity 50 of the stem. A washer 51 under the nut 49 slidably engages the lock case 22 to prevent withdrawal of the stem 16 from the lock case, the end portion of the stem being extended through a flanged opening 52 provided therefor in the wall of the lock case.

It is believed the foregoing description conveys a good understanding of the objects and advantages of my invention. The appended claims have been drawn to cover all legitimate modifications and adaptations.

I claim:

1. In a lock for the lid of a rear luggage compartment or other receptacle wherein there is a keeper providing a bolt recess and an eye for a hook in inwardly spaced relation thereto, the combination of a lock case, a bolt slidable in the lock case having a wedge-shaped end arranged to be extended from said case into wedging engagement in the recess in the keeper, a hook pivoted relative to the lock case to swing outwardly therefrom in a plane parallel to the plane of movement of the bolt for cooperation with the eye of the keeper, means operatively connecting the hook with the bolt, whereby the hook is arranged to be swung toward and away from the eye in the reciprocatory movement of the bolt in a predetermined timed relation to the movement of the bolt, the hook being moved toward operating engagement with the eye after predetermined movement of the bolt into the recess has caused the lock case to be positioned so that the hook is in coplanar relation to the eye, and means for operating the bolt, said means operatively connecting the hook with the bolt comprising a pin on the bolt slidable in a slot provided in the hook, said slot being shaped so that the hook is operated in retarded relation to the bolt in the advancement of the bolt and hook to operative position but is operated in the opposite direction in the initial retracting movement of the bolt, substantially as and for the purpose described.

2. A lock of the character described comprising a case providing a guideway, a bolt slidably guided therein for lineal movement to and from an operative extended position in engagement with a keeper, a hook member pivotally mounted at one end on the outside of said case having a slot provided therein intermediate the ends thereof, the slot being in eccentric relation to said pivot and having one end at a small radial distance from the pivot and the other end at a larger radial distance from the pivot, the free end of said hook member having a hook projection adapted to engage an eye in fixed spaced relation to that portion of the keeper engaged by the bolt, and a pin movable with said bolt extending from the guide and slidably engaged in the slot in said hook member to swing the hook member toward engagement with the eye in a predetermined timed relationship to the lineal movement of said bolt toward engagement with the keeper.

3. In closing and locking means for the hinged lid on an automobile trunk or other receptacle wherein there is a keeper providing a bolt recess and an eye for a hook in inwardly spaced relation thereto, the combination of a lock case on the trunk lid, a bolt reciprocable in the case and arranged to be extended therefrom into the recess in the keeper, the free end of said bolt having a cam surface thereon whereby on movement of the bolt into the recess the lid is drawn inwardly and tightly closed on the trunk, a hook pivotally mounted on the case for swinging movement in a plane parallel to the plane of movement of the bolt toward and away from the eye on the keeper, pin and slot means interconnecting the bolt and hook whereby the hook is arranged to be swung toward operative engagement with the eye in a predetermined lagging relation to the movement of the bolt toward operative engagement in the bolt recess, the hook when swung home into the eye preventing upward movement of the lid by prying action whereby to keep the bolt engaged in the recess, and means for moving said bolt to either of its two extreme positions.

4. A lock mechanism including a pair of movable lock elements detachably engageable with a fixed keeper member, one of said lock elements being movable lineally into locking engagement with the keeper member, and the other lock element being movable arcuately and having a hooked free end to hook onto the keeper member, a common operating member for said lock elements, means providing an operating connection between the lineally movable element and said operating member, and pin and slot means providing an operating connection between the lineally movable element and the arcuately movable element so that the arcuately movable element is moved in a predetermined lagging relationship to the lineally movable element in the locking movement of the latter and is given relatively large angularity of movement in the comparatively short lineal movement of the bolt member from one limit position to the other.

5. In a lock for a rear luggage compartment lid or other receptacle lid, the combination of a lock case and a slidable bolt member guided therein for reciprocatory movement toward and away from locking engagement with a keeper, a hook member pivoted on the case for swinging movement in a plane parallel to the bolt toward and away from locking engagement with the keeper, means for reciprocating the bolt, and pin and slot connections between the bolt and hook members to swing the hook member in a predetermined lagging relationship to the bolt member in the locking movement of the latter and is swung through relatively large angularity of movement in the comparatively short lineal movement of the bolt member from one limit position to the other.

WALTER R. LUSTIG.